United States Patent Office

3,296,275
Patented Jan. 3, 1967

3,296,275
PROCESS FOR THE MANUFACTURE
OF PYRIDINE DERIVATIVES
Sidney Frank Schaeren, Bottmingen, Switzerland, assignor to Hoffmann-La Roche Inc., Nutley, N.J., a corporation of New Jersey
No Drawing. Filed May 10, 1965, Ser. No. 454,651
Claims priority, application Switzerland, May 27, 1964, 6,921/64
12 Claims. (Cl. 260—297)

The present invention relates to a new improved manufacturing process. By employment of the new improved process of this invention better utilization of expensive starting material is achieved, thereby affording a more economical production of the pyridine end products of the process of this invention. One of the pyridine end products obtainable by the process of this invention is pyridoxine, i.e. vitamin $B_6$. The significance and value of the new improved process of this invention is thus self-apparent.

The present invention constitutes a new improved process for the manufacture of pyridine derivatives of the formula

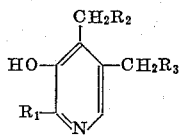

and acid addition salts thereof;
wherein $R_1$ is lower alkyl; $R_2$ and $R_3$ taken together are selected from the group consisiting of a grouping of the formula

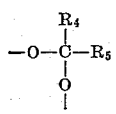

wherein $R_4$ and $R_5$ are selected from the group consisting of, individually, hydrogen, lower alkyl, lower alkenyl, phenyl-lower alkyl and phenyl and, taken together, lower alkylene.

As used herein the term lower alkyl comprehends both straight and branched chain, saturated, aliphatic hydrocarbon radicals containing up to six carbon atoms such as methyl, ethyl, propyl, isopropyl and the like. The term lower alkenyl similarly relates to both straight and branched chain aliphatic unsaturated hydrocarbon radicals containing up to six carbon atoms such as allyl and the like. The term lower alkylene comprehends methylene and polymethylene groups such as methylene, ethylene, propylene, butylene and the like.

Of the pyridine derivatives of Formula I, which are known compounds, preferred products of the process of this invention are those of Formula I in which $R_1$ is methyl since this is the significance of $R_1$ in the pyridoxine molecule. When $R_1$ is methyl and $R_2$ and $R_3$ taken together are the grouping of Formula II, the compounds symbolized are acetals of pyridoxine which can be converted into pyridoxine according to known methods. Preferred compounds of this latter group are those in which $R_4$ and $R_5$ are each independently selected from the group consisting of hydrogen or an alkyl group of 1–3 carbon atoms; especially preferred are those in which at least one $R_4$ and $R_5$ is such an alkyl group, for example, the isopropyl group.

The process of this invention, which is a highly economical process for the preparation of pyridine derivatives of Formula I, comprises reacting at an elevated temperature a compound of the formula

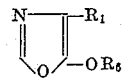

wherein:
$R_1$ has the same meaning as above and
$R_6$ is lower alkyl;
with a compound of the formula

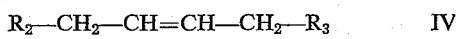

wherein $R_2$ and $R_3$ have the same meaning as above; which reaction gives a Diels-Alder adduct which is isolated and then rearranged at a temperature lower than that at which the addition reaction is effected. By being placed in a weakly acidic medium, the compound of Formula I thus obtained can then, if desired, be hydrolyzed to a compound of Formula I wherein each of $R_2$ and $R_3$ is hydroxy and/or be converted into an acid addition salt.

A principal feature of this invention is the aspect which constitutes conducting the addition reaction of a compound of Formula III with a compound of Formula IV in a step substantially separate from the rearrangement of the Diels-Alder adduct thus obtained. Not only are these steps conducted substantially separate but, as indicated, under different conditions. It has been discovered that there is thus effected a surprisingly more economical conversion resulting in higher yields.

Exemplary starting materials of Formula III are 4-methyl-5-lower alkoxy-oxazole such as 4-methyl-5-methoxy-oxazole, 4-methyl-5-ethoxy-oxazole and 4-methyl-5-isopropoxy-oxazole, with 4-methyl-5-ethoxy-oxazole being especially preferred.

Starting materials of Formula IV are 4,7-dihydro-1,3-dioxepins. A preferred group of starting materials of Formula IV are 2-lower alkyl-4,7-dihydro-1,3-dioxepins and 2,2-di(lower alkyl)-4,7-dihydro-1,3-dioxepins, especially preferred is 2-isopropyl-4,7-dihydro-1,3-dioxepin.

As can be gathered from the above indications, an especially preferred embodiment of the present invention is the utilization of 4-methyl-5-ethoxy-oxazole as the starting material of Formula III and 2-isopropyl-4,7-dihydro-1,3-dioxepin as the starting material of Formula IV.

In the first step of the process of this invention, which step involves the addition reaction of the compounds of Formulae III and IV, one of the two starting materials, preferably that of Formula IV, is advantageously used in at least a 10-fold molar excess. It is especially preferable when using 2-isopropyl - 4,7-dihydro-1,3-dioxepin, which is the preferred starting material of Formula IV, to use a 15 to 20-fold molar excess thereof (i.e., with respect to the quantity of the starting material of Formula III, e.g., 4-methyl-5-ethoxy-oxazole).

In order to maximize the yield of the Diels-Alder adduct obtained by the addition reaction of a compound of Formula III with a compound of Formula IV and in order to avoid a premature rearrangement of the addition product during the course of the first step, which has been found to have a detrimental effect on the over-all yield and economics of the process, the reaction of the starting materials of Formula III and Formula IV should be carried out under conditions which are as mild as possible. It has been found advantageous to effect the reaction of the compound of Formula III with the compound of Formula IV at temperatures between about 130° C. and about 170° C. When conducted in this temperature range it has also been found suitable to limit the duration of the heating of the two reactants to about 5 hours at most. A preferred embodiment of this invention comprehends heating a compound of Formula III with a compound of Formula IV at about 170° C. for a period of between about 3 to about 5 hours. When 4-methyl-5-ethoxy-oxazole and 2-isopropyl-4,7-dihydro-1,3-dioxepin are used as starting materials, heating at reflux (about 170° C.) for about 3 hours has been found to suffice. If this reaction is carried out using about 15-fold molar excess of 2-isopropyl-4,7-dihydro-1,3-dioxepin, about 80% of the oxazole has reacted at the end of 3 hours heating.

After the compound of Formula III and the compound of Formula IV have been heated together as described above, the excess starting material is suitably recovered from the reaction mixture. This can be effected, for example, by subjecting the mixture to vacuum distillation. The distillation residue thereby obtained contains the desired Diels-Alder adduct of Formula V infra which is subsequently subjected to rearrangement in the second step of the process of this invention. The distillate obtained from such a vacuum distillation containing mainly excess starting material of Formula IV and unreacted starting material of Formula III is suitably then added to such a quantity of starting material of Formulae III and IV that there is obtained a new reaction mixture of starting materials of Formulae III and IV in which the starting material of Formula IV is again present in at least about a 10-fold molar excess (when using 2-isopropyl-4,7-dihydro-1,3-dioxepin as the starting material of Formula IV, it is preferable to reconstitute about a 15-20-fold molar excess thereof).

This new reaction mixture can then be subjected to the reaction conditions to effect the desired addition reaction. This procedure of reaction, separation, reconstitution, reaction, etc., can be repeated several times. Optimization will differ depending upon the specific reactants and reaction conditions selected.

The Diels-Alder adduct reaction product obtained by the addition reaction which is the first step of the process of this invention can be represented by the following formula

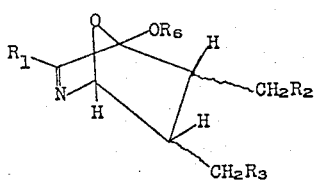

V wherein $R_1$, $R_2$, $R_3$ and $R_6$ have the same meaning as above.

Those compounds of Formula V in which $R_2$ and $R_3$ taken together are the grouping of Formula II and in which $R_4$ and $R_5$ have the same meaning, occur in two stereoisomeric racemates, each of two optical antipodes. Those compounds of Formula V in which the substituents $R_4$ and $R_5$ of the grouping of Formula II are different from each other can form four stereoisomeric racemates, once again each racemate containing two optical antipodes. All these are within the ambit of this invention.

After being isolated the Diels-Alder adduct obtained by the first step of the process of this invention is subjected to the second step of the process of this invention which second step effects the rearrangement to yield a pyridine derivative of Formula I. This rearrangement is effected at a temperature lower than that at which the addition reaction has been effected and in a weakly acidic medium. The temperature at which the rearrangement is effected should be such that the rearrangement is not affected by thermal influences, but, on the contrary, is essentially effected solely on the basis of the presence of the weakly acidic medium. The selection of the temperature of this step is especially of significance since at the temperatures at which the rearrangement of the Diels-Alder adduct is effected in a terminal manner, which rearrangement proceeds very slowly, there is partial decomposition of the desired product of Formula I. It has been found suitable to use temperatures up to about 50° C. Thus the rearrangement should be effected in a weakly acidic medium and at a temperature not higher than about 50° C. It is especially preferred to conduct the rearrangement at room temperature.

The weakly acidic medium should be sufficiently acidic to effect the rearrangement yet not so acidic as to effect the hydrolysis of the pyridine derivative of Formula I to the corresponding 4,5-dimethylol compound. The rearrangement is suitably affected in a weakly acidic medium of a pH between about 2.3 and about 3.5. More particularly, it is especially preferred to conduct the rearrangement in a weakly acidic medium having an acidity about the same as that of a 10% aqueous solution of pyridoxine hydrochloride.

As acidic agents which can be used for the preparation of the weakly acidic medium, acids both organic and inorganic and of a wide variety can be used: examples are hydrochloric acid, sulphuric acid, tartaric acid and oxalic acid. Preferably, an aqueous, lower alkanol solution of these or other acidic agents is used as the weakly acidic medium. In a preferred embodiment, pyridoxine hydrochloride itself is used as the acidic agent in the weakly acidic medium.

Subsequent to the rearrangement, the pyridine derivatives of Formula I can, if desired, be hydrolyzed to compounds of Formula I in which each of $R_2$ and $R_3$ is hydroxy. This hydrolysis can be effected by known means (e.g., by means of hydrochloric acid). The acidity of the medium utilized to effect the hydrolysis is considerably higher than that of the weakly acid medium in which the rearrangement of the Diels-Alder adduct into compounds of Formula I is effected (for example, the acidity of the hydrolysis medium can be at a pH of about 0.5).

The products of the process of this invention of Formula I can be obtained directly as acid addition salts due to salt formation with the acid present in the acidic medium used for their preparation. However, insofar as they are not already obtained as salts, they can be converted into acid addition salts according to known methods. Preferred acid addition salts are pharmaceutically acceptable acid addition salts, for example, both organic and inorganic acid addition salts such as acid addition salts formed from hydrochloric acid, sulphuric acid, tartaric acid, oxalic acid, phosphoric acid and the like. The acid addition salt with hydrochloric acid is especially preferred. Non-pharmaceutically acceptable acid addition salts can be converted into pharmaceutically acceptable acid addition salts by conventional means, for example, conversion into the free base by neutralization followed by treatment with an acid which yields a pharmaceutically acceptable acid addition salt.

The following examples are illustrative but not limitative of the process of the invention. All temperatures are stated in degrees centigrade.

*Example 1*

A mixture of 426.6 g. of 2-isopropyl-4,7-dihydro-1,3-dioxepin (3 mol) and 25.4 g. of 4-methyl-5-ethoxy-oxazole (0.20 mol) in a 1-liter round flask fitted with thermometer, reflux condenser and gas inlet tube, was refluxed under argon for 3 hours in an oil-bath held at 190°. The reaction mixture was then subjected to a distillation on the rotary evaporator for the purpose of recovering unreacted starting materials. The distillation residue (Diels-Alder adduct) was set aside and separately worked up.

The distillate, containing about 20% of unreacted 4-methyl-5-ethoxy-oxazole, was brought to the original molar proportion 15:1 with 115.4 g. of 2-isopropyl-4,7-dihydro-1,3-dioxepin (0.812 mol) and 25.4 g. of 4-methyl-5-ethoxy-oxazole (0.20 mol) and again boiled at reflux for 3 hours. This procedure was carried out six times and except for the first distillation residue (in the first reaction only 80% of the oxazole was reacted) gave altogether 258.4 g. of Diels-Alder adduct (yield for these 5 reactions: 96.2%).

10.25 g. of pyridoxine hydrochloride (0.050 mol), 200 ml. of water and 250 ml. of 94% ethyl alcohol were placed under argon in a 1.5-liter four-necked round flask fitted with stirrer, thermometer, dropping-funnel and gas inlet tube. A solution of the above Diels-Alder adduct (258.4 g.) in 100 ml. of 94% ethyl alcohol was added dropwise over a duration of 2 hours to the so-obtained solution. During the addition the reaction mixture was held at 25° with a water-bath and subsequently stirred at room temperature for a further 15 hours. The reaction mixture so-obtained was then treated with 245 ml. of 3 N hydrochloric acid and the alcohol evaporated off in a water-jet vacuum.

100 ml. of concentrated hydrochloric acid was added to the above obtained solution of the hydrochloride of pyridoxine-isobutyraldehyde acetal and isobutyraldehyde was first evaporated off on the rotary evaporator with a reduced water-jet vacuum, and subsequently water was evaporated off with a full water-vacuum (water-bath at 70°). The dry residue was then suspended in 250 ml. of absolute ethyl alcohol and left to stand overnight at −20°. Thereafter, the product was filtered off by suction and dried to constant weight. 189.1 g. of pyridoxine hydrochloride, M.P. 207–210°, was obtained.

(189.1−10.25=178.85 g. or 87% yield)

*Example 2*

A mixture of 300.3 g. of 4,7-dihydro-1,3-dioxepin (3 mols) and 25.4 g. of 4-methyl-5-ethoxy-oxazole (0.20 mol) in a 500 ml. stainless steel autoclave fitted with manometer and thermometer was heated under argon in an oil-bath held at 180° for three hours, during which time the pressure rose to 3 atm. The cooled reaction mixture was subjected to distillation on a rotary evaporator for the purpose of recovering unreacted starting materials. The distillation residue (Diels-Alder adduct) was set aside and separately worked up. The distillate, containing about 20% of unreacted 4-methyl-5-ethoxy-oxazole, was brought to the original molar proportion 15:1 with 81.2 g. of 4,7-dihydro-1,3-dioxepin (0.812 mol) and 25.4 g. of 4-methyl-5-ethoxy-oxazole (0.20 mol) and heated in the autoclave for three hours. This procedure was carried out six times, and except for the first distillation residue (in the first reaction only 80% of the oxazole was reacted) gave altogether 221.0 g. of Diels-Alder adduct (yield for these 5 reactions: 97%). The mixture of the two stereoisomeric racemates (ca. 50:50) has a M.P. of 50–70°. By fractional crystallization from isopropyl ether it is possible to separate the endo-exo-racemates (M.P. 100–102° and 90–91°).

10.25 g. of pyridoxine hydrochloride (0.050 mol) and 200 ml. of water were placed under argon in a 1-liter four-necked flask fitted with stirrer, thermometer, dropping-funnel and gas inlet tube. A solution of the above Diels-Alder adduct (221.0 g.) in 200 ml. of water was then added dropwise to the aqueous pyridoxine hydrochloride solution over a duration of 2 hours. During the addition the reaction mixture was kept in a water-bath maintained at 20°. After the addition the reaction mixture was stirred at room temperature for a further 15 hours. The mixture was then treated with 245 ml. of 3 N hydrochloric acid and the water evaporated off at 70° in a water-jet vacuum.

The so-obtained crude hydrochloride of pyridoxine-formaldehyde acetal (198 g.) was heated with 800 ml. of approximately 25% methanolic hydrochloric acid and, with ice-bath cooling, the solution was saturated with hydrogen chloride gas. The reaction vessel was fitted with a Vigreux attachment and the reaction mixture was heated in an oil-bath held at 90° in such a way that the methylal (dimethoxymethane) formed distilled off over the course of three hours. The reaction mixture was then evaporated to dryness on a rotary evaporator and the residue was triturated with a mixture of 200 ml. of methanol and 200 ml. of acetone. After 15 hours cooling (5°) [the mixture] was filtered by suction and the solid residue washed with acetone and dried to constant weight. 186.3 g. of pyridoxine hydrochloride, M.P. 208–210°, was thus obtained (186.3−10.25=176 g. or 85% yield).

I claim:

1. A process for the manufacture of compounds selected from the group consisting of pyridine derivatives of the formula

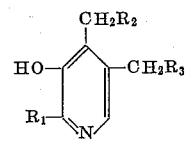

and acid addition salts thereof;

wherein $R_1$ is lower alkyl; $R_2$ and $R_3$, taken together, are selected from the group consisting of a grouping of the formula

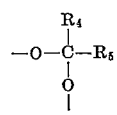

wherein $R_4$ and $R_5$ are selected from the group consisting of, individually, hydrogen, lower alkyl, lower alkenyl, phenyl-lower alkyl and phenyl and, taken together, lower alkylene;

which comprises reacting at a temperature between about 130° C. and about 170° C., a compound of the formula

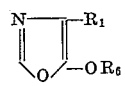

wherein $R_1$ has the same meaning as above and $R_6$ is lower alkyl;

with a compound of the formula

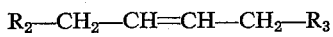

wherein $R_2$ and $R_3$ have the same meaning as above;

which reaction gives a Diels-Alder adduct, which is isolated and then rearranged in a weakly acidic medium at a temperature up to about 50° C.

2. A process as in claim 1 which comprises the additional step of hydrolyzing the so-obtained compound of the formula

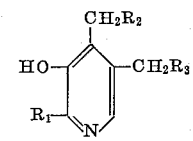

wherein $R_1$, $R_2$ and $R_3$ have the same meaning as in claim 1, to obtain a compound of the formula

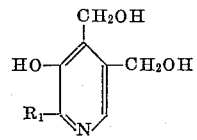

wherein $R_1$ has the same meaning as above.

3. A process according to claim 1 wherein the rearrangement is effected at about room temperature.

4. A process according to claim 3 wherein the weakly acidic medium used for the rearrangement is of a pH between about 2.3 and about 3.5.

5. A process according to claim 1 wherein the starting material of the formula $R_2\text{—}CH_2\text{—}CH\text{=}CH\text{—}CH_2\text{—}R_3$ is used in at least about 10-fold molar excess with respect to the 4-lower alkyl-5-lower alkoxy-oxazole starting material.

6. A process according to claim 5 wherein the starting materials are heated together for a period of from about 3 to about 5 hours.

7. A process for the preparation of 1,5-dihydro-3-lower alkyl-8-methyl-pyridine[3,4-e][1,3]dioxepin-9-ol which comprises reacting at a temperature between about 130° C. and about 170° C. 4-methyl-5-lower alkoxy-oxazole with 2-lower alkyl-4,7-dihydro-1,3-dioxepin; isolating the Diels-Alder adduct so-obtained and rearranging said Diels-Alder adduct in a weakly acidic medium at a temperature no greater than about 50° C.

8. A process for the preparation of 1,5-dihydro-3-isopropyl-8-methyl-pyridine[3,4-e][1,3]dioxepin-9-ol which comprises reacting at a temperature of between about 130° C. and 170° C. 4-methyl-5-ethoxy-oxazole with 2-isopropyl-4,7-dihydro-1,3-dioxepin; isolating the Diels-Alder adduct so-obtained and rearranging said Diels-Alder adduct in a weakly acidic medium at a temperature no greater than about 50° C.

9. A process as in claim 8 wherein the 2-isopropyl-4,7-dihydro-1,3-dioxepin starting material is used in a molar excess of from about 15-fold to about 20-fold with respect to the 4-methyl-5-ethoxy-oxazole starting material.

10. A process according to claim 9 wherein the starting materials are heated together at about 170° C. for a period of from about 3 to about 5 hours.

11. A process according to claim 1 wherein the Diels-Alder adduct is separated by vacuum distillation and further quantities of the starting materials are added to the distillate resulting from said vacuum distillation after which said reconstituted mixture of the starting materials is again subjected to the conditions of the addition reaction.

12. A process according to claim 4 wherein pyridoxine hydrochloride is utilized as the acidic agent in the weakly acidic medium.

References Cited by the Examiner
UNITED STATES PATENTS 3,250,778    5/1966    Kimel et al. _____ 260—297

OTHER REFERENCES

Harris et al.: "J. Org. Chem.," vol. 27, pp. 2705–6 (1962).

Huang et al.: "IZO," Akad. Nawk SSSR Odt. Khim. Nawk (1962), pp. 525–6.

WALTER A. MODANCE, *Primary Examiner.*

R. T. BOND, *Assistant Examiner.*